(12) United States Patent
Wind et al.

(10) Patent No.: US 11,714,195 B2
(45) Date of Patent: Aug. 1, 2023

(54) OPTICAL TIME OF ARRIVAL AIRFOIL MEASUREMENT PROBE

(71) Applicant: Raytheon Technologies Corporation, Farmington, CT (US)

(72) Inventors: Darren M. Wind, Glastonbury, CT (US); Michael J. Saitta, East Hampton, CT (US); Ian F. Agoos, Boston, MA (US); Alan E. Ingram, Palm City, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 402 days.

(21) Appl. No.: 17/063,028

(22) Filed: Oct. 5, 2020

(65) Prior Publication Data
US 2022/0107416 A1 Apr. 7, 2022

(51) Int. Cl.
*G01S 17/89* (2020.01)
*G01B 11/24* (2006.01)
(Continued)

(52) U.S. Cl.
CPC .............. *G01S 17/89* (2013.01); *G01B 11/24* (2013.01); *G01M 11/081* (2013.01); *G01M 15/14* (2013.01); *G01S 7/4813* (2013.01)

(58) Field of Classification Search
CPC ....... G01S 17/89; G01S 7/4813; G01B 11/16; G01B 11/24; G01M 15/14; G01M 5/0016; G01M 11/081
See application file for complete search history.

(56) References Cited

U.S. PATENT DOCUMENTS 4,357,104 A * 11/1982 Davinson ............... G01B 11/14
250/559.38
4,657,386 A 4/1987 Suarez-Gonzalez et al.
(Continued)

FOREIGN PATENT DOCUMENTS

EP 1797813 A1 6/2007
EP 2341324 A2 7/2011
(Continued)

OTHER PUBLICATIONS

Jones "Shedding light on vibration" Mechanical Engineering 118.11 (Nov. 1996) pp. 94-97.
(Continued)

*Primary Examiner* — Loren C Edwards
(74) *Attorney, Agent, or Firm* — Cantor Colburn LLP

(57) ABSTRACT

An optical probe includes an optical housing, a transmitting lens and a receiving lens. The optical housing extends from a proximate end to an opposing distal end. The transmitting lens is disposed at the distal end and is configured to output a first transmitted signal beams having a first transmission axis and a second transmitted beam having a second transmission axis that is different from the first transmission axis. The receiving lens is disposed at the distal end and configured to receive the first and second reflected signal beams corresponding respectively to the first and second transmitted signal beams. The optical housing has formed therein a transmitting optical channel configured to communicate an input optical signal from the proximate end to the transmitting lens. A receiving optical channel separated from the transmitting optical channel communicates the first and second reflected signal beams to the proximate end.

20 Claims, 3 Drawing Sheets

(51) Int. Cl.
  *G01M 15/14* (2006.01)
  *G01S 7/481* (2006.01)
  *G01M 11/08* (2006.01)

(56) References Cited

U.S. PATENT DOCUMENTS

| | | |
|---|---|---|
| 4,666,297 A | 5/1987 | Suarez-Gonzalez |
| 4,696,544 A | 9/1987 | Costella |
| 4,708,474 A | 11/1987 | Suarez-Gonzalez |
| 5,293,040 A * | 3/1994 | Watanabe ............ G01P 3/56 250/231.1 |
| 5,557,099 A | 9/1996 | Zielinski et al. |
| 8,256,297 B2 | 9/2012 | Sue et al. |
| 9,297,720 B2 | 3/2016 | Agoos et al. |
| 9,404,735 B2 | 8/2016 | Paul et al. |
| 9,518,894 B2 | 12/2016 | Leroux et al. |
| 9,766,156 B2 * | 9/2017 | Hockaday ............ G01M 11/083 |
| 10,024,761 B2 | 7/2018 | Cornes et al. |
| 10,605,108 B2 | 3/2020 | Miyamoto et al. |
| 2007/0153296 A1 | 7/2007 | Schick |
| 2010/0171956 A1 | 7/2010 | Sappey et al. |
| 2012/0069355 A1 | 3/2012 | Hynous |
| 2014/0064924 A1 | 3/2014 | Warren |
| 2014/0083215 A1 | 3/2014 | Warren |
| 2014/0268100 A1 | 9/2014 | Paul et al. |
| 2014/0270625 A1 | 9/2014 | Warren et al. |
| 2016/0194976 A1 | 7/2016 | Smith |
| 2016/0273974 A1 | 9/2016 | Hockaday |
| 2019/0169355 A1 | 6/2019 | Warren et al. |
| 2019/0170011 A1 | 6/2019 | Warren et al. |
| 2020/0096331 A1 | 3/2020 | Warren et al. |

FOREIGN PATENT DOCUMENTS

| | | |
|---|---|---|
| EP | 3327405 A1 | 5/2018 |
| WO | 2007115314 A2 | 10/2007 |
| WO | 2014143295 A1 | 9/2014 |

OTHER PUBLICATIONS

European Search Report for European Application No. 21201020.1; Application Filing Date Oct. 5, 2021; dated Feb. 24, 2022 (4 pages).

European Search Report issued in European Application No. 19186112.9; Application Filing Date Jul. 12, 2019; dated Jan. 22, 2020 (8 pages).

* cited by examiner

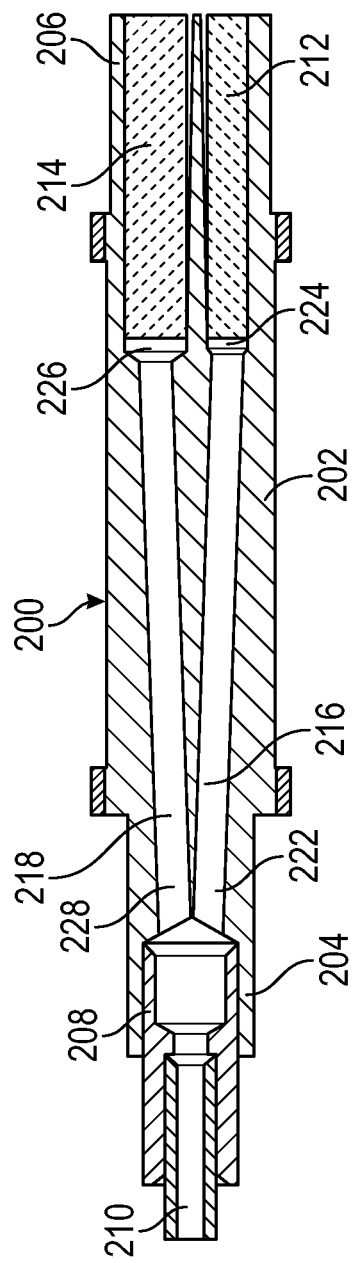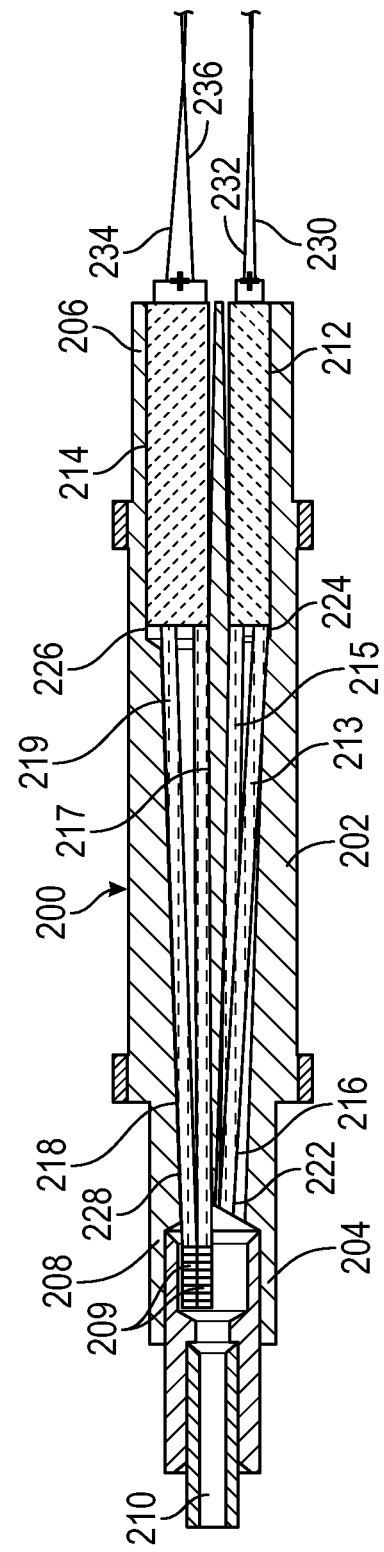

OPTICAL TIME OF ARRIVAL AIRFOIL MEASUREMENT PROBE

BACKGROUND

This disclosure relates to electromagnetic communication, and more particularly to, an optical probe configured to measure characteristics of an aircraft airfoil.

Gas turbine engines typically include a compressor, a combustor, and a turbine, with an annular flow path extending axially through each. Initially, air flows through the compressor where it is compressed or pressurized. The combustor then mixes and ignites the compressed air with fuel, generating hot combustion gases. These hot combustion gases are then directed from the combustor to the turbine where power is extracted from the hot gases by causing airfoils (also referred to as blades) of the turbine to rotate.

The compressor and turbine sections include multiple rotors and stators. Gas turbine engines maintain a clearance (e.g., distance) between the tips of the rotors and an outside diameter of a gas path within the turbine engine, and thereby provide the conditions necessary to achieve a desired performance.

BRIEF DESCRIPTION

An optical probe includes an optical housing, a transmitting lens and a receiving lens. The optical housing extends from a proximate end to an opposing distal end. The transmitting lens is disposed at the distal end and is configured to output a first transmitted signal beams having a first transmission axis and a second transmitted beam having a second transmission axis that is different from the first transmission axis. The receiving lens is disposed at the distal end and configured to receive the first and second reflected signal beams corresponding respectively to the first and second transmitted signal beams. The optical housing has formed therein a transmitting optical channel configured to communicate an input optical signal from the proximate end to the transmitting lens. A receiving optical channel separated from the transmitting optical channel communicates the first and second reflected signal beams to the proximate end.

In addition to one or more of the features described above or below, or as an alternative, further embodiments may include a feature wherein the transmitting optical channel extends from a transmitting channel input to a transmitting channel output, and wherein the receiving optical channel extends from a receiving channel input to a receiving channel output.

In addition to one or more of the features described above or below, or as an alternative, further embodiments may include a feature, wherein the transmitting channel input is in signal communication with the signal port to receive an input optical signal from a signal line, and the transmitting channel output is in signal communication with the transmitting lens.

In addition to one or more of the features described above or below, or as an alternative, further embodiments may include a feature, wherein the receiving channel input is in signal communication with the receiving lens to receive a reflected optical signal, and the receiving channel output is in signal communication with the signal port to deliver the reflected optical signal to the signal line.

In addition to one or more of the features described above or below, or as an alternative, further embodiments may include at least one transmitting optical fiber disposed in the transmitting channel and at least one receiving optical fiber disposed in the receiving channel.

In addition to one or more of the features described above or below, or as an alternative, further embodiments may include a feature, wherein the at least one transmitting optical fiber has a first diameter and the at least one receiving optical fiber has a second diameter that is the same as the first diameter.

In addition to one or more of the features described above or below, or as an alternative, further embodiments may include a feature, wherein the at least one transmitting optical fiber has a first diameter and the at least one receiving optical fiber has a second diameter that is larger than the first diameter.

In addition to one or more of the features described above or below, or as an alternative, further embodiments may include a feature, wherein the proximate end includes the signal port configured to receive the signal line capable of communicating an optical signal.

In addition to one or more of the features described above or below, or as an alternative, further embodiments may include a feature, wherein the transmitting lens has a first lens diameter the receiving lens has a second lens diameter that is the same as the first lens diameter.

In addition to one or more of the features described above or below, or as an alternative, further embodiments may include a feature, wherein the transmitting lens has a first lens diameter the receiving lens has a second lens diameter that is greater than the first lens diameter.

In addition to one or more of the features described above or below, or as an alternative, further embodiments may include a feature, wherein the first and second transmitting signal beams is spread from the transmitting lens in a V-shaped pattern so as to measure two different targeted locations.

In addition to one or more of the features described above or below, or as an alternative, further embodiments may include a feature, wherein the receiving lens is configured to receive the first and second reflected signal beams produced in response to the first and second transmitting signal beams reflecting from respective target locations.

According to another non-limiting embodiment, a method of detecting a deflection in an airfoil comprises generating an input optical signal and transmitting the input optical signal from a proximate end of an optical probe to a distal end of the optical probe via an optical channel. The method further comprises outputting a first and second transmitted signal beams in response to delivering the input optical signal through a transmitting lens disposed at a distal end of the optical probe. The method further comprises reflecting the transmitted signal beams from the airfoil to produce a first and second reflected signal beams. The method further comprises receiving the first and second reflected signal beams by a receiving lens disposed at the distal end of the optical probe, and determining the deflection of the airfoil based on the first and second reflected signal beams.

In addition to one or more of the features described above or below, or as an alternative, the method further comprises transmitting the input optical signal along at least one transmitting optical fiber disposed in the transmitting channel.

In addition to one or more of the features described above or below, or as an alternative, the method further comprises receiving the first and second reflected signal beams further comprises transmitting the first and second reflected signals along at least one receiving optical fiber disposed in the receiving channel.

In addition to one or more of the features described above or below, or as an alternative, the at least one transmitting optical fiber has a first diameter and the at least one receiving optical fiber has a second diameter that is the same as the first diameter.

In addition to one or more of the features described above or below, or as an alternative, the at least one transmitting optical fiber has a first diameter and the at least one receiving optical fiber has a second diameter that is larger than the first diameter.

In addition to one or more of the features described above or below, or as an alternative, the method further comprises outputting the first and second transmitted signal beams further comprises spreading the first and second transmitted signal beams from the transmitting lens in a V-shaped pattern so as to measure two different targeted locations.

In addition to one or more of the features described above or below, or as an alternative, the method further comprises receiving the first and second reflected signal beams further comprises receiving the first and second reflected signal beams in response to the first and second transmitting signal beams reflecting from the target locations.

In addition to one or more of the features described above or below, or as an alternative, the method further comprises converting the first and second reflected signals into electrical pulses, and determining the deflection based on the reflected signals.

A technical effect of the apparatus, systems and methods is achieved by an optical probe configured to measure airfoils included in a gas turbine engine as described herein.

BRIEF DESCRIPTION OF THE DRAWINGS

The following descriptions should not be considered limiting in any way. With reference to the accompanying drawings, like elements are numbered alike:

FIG. 1 depicts an optical probe excluding optical fibers according to a non-limiting embodiment of the disclosure;

FIG. 2 depicts the optical probe shown in FIG. 1 including optical fibers according to a non-limiting embodiment of the disclosure;

DETAILED DESCRIPTION

Figure 3:
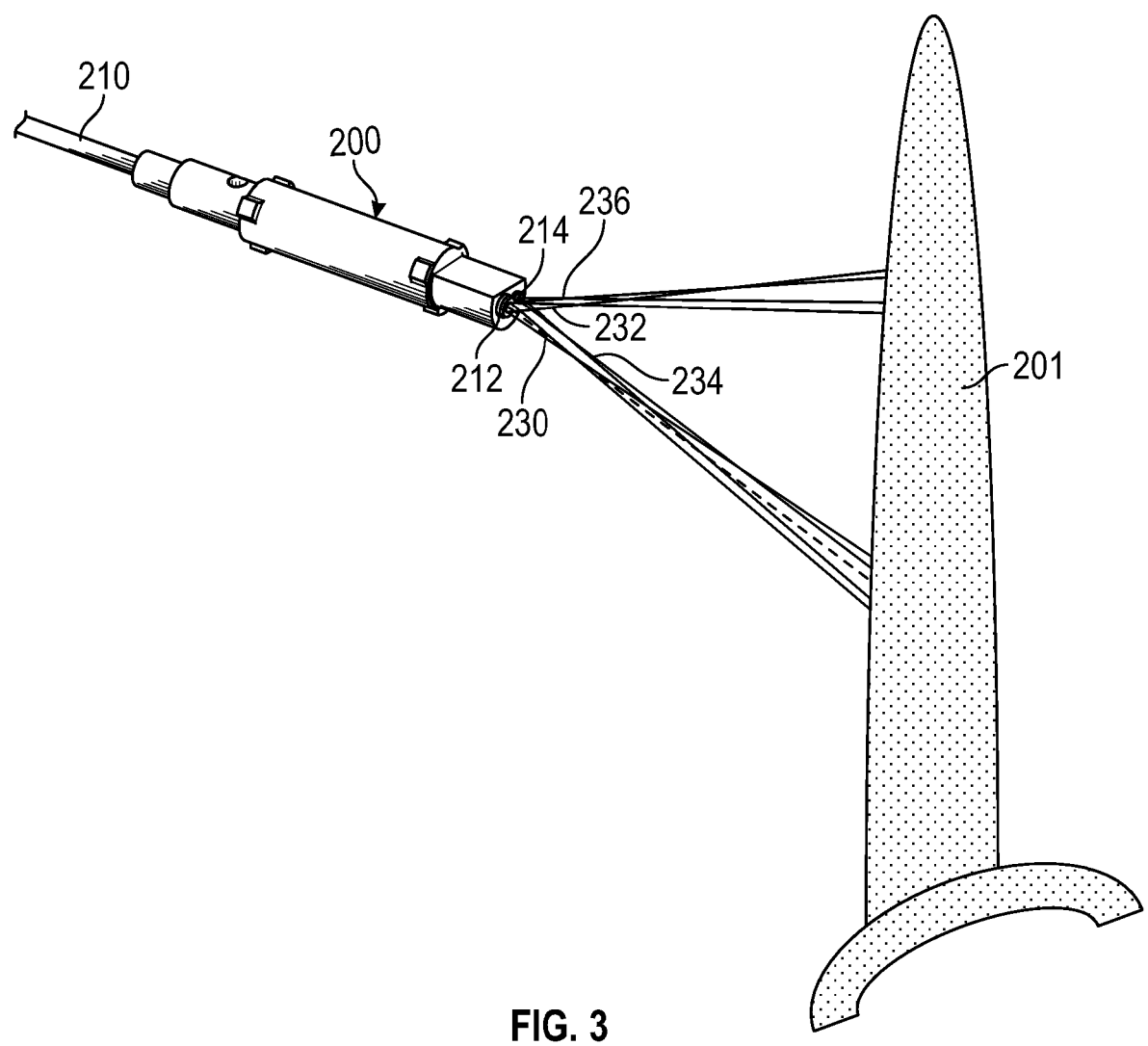
FIG. 3 depicts an optical probe performing an optical measurement on an airfoil according to a non-limiting embodiment of the disclosure.

A detailed description of one or more embodiments of the disclosed apparatus and method are presented herein by way of exemplification and not limitation with reference to the Figures.

Gas turbine engines include a several airfoil (also referred to as blades). The blades are susceptible to deflection during turbine engine operation, for example due to inlet compression or combustion gas transients or steam backpressure. Various embodiments of the present disclosure provide an optical probe configured to perform optical measurements on one or more airfoils included in a gas turbine engine. The gas turbine engine can be included, for example, in an aircraft vehicle. In one or more non-limiting embodiments, the optical probe is configured to output first and second transmit signal beams and receive first and second of reflected signal beams. The first and second signal beams are spread from a lens in a V-shaped pattern so as to measure two different targeted locations, e.g., two different radial location on an airfoil. The two different radial locations can be referred to as an inboard target location and an outboard target location.

The corresponding first and second reflected signal beams, e.g., the reflected inboard beam reflected from to the inboard location and the reflected outboard beam reflected from the outboard location can be analyzed (e.g., by a controller) to determine characteristics of the airfoil such as, for example, airfoil deflection. For example, a time of arrival associated with the reflected inboard beam and the reflected outboard beam can be calculated and analyzed to determine deflection of the airfoil.

With reference now to FIG. 1, an optical probe 200 is illustrated according to a non-limiting embodiment. The optical probe includes an optical housing 202 extending from a proximate end 204 to an opposing distal end 206. Although the optical housing 202 is illustrated as extending in a substantially straight direction from the proximate end 204 to the distal end 206, the profile of the optical housing 202 is not limited thereto. For example, the optical housing 202 can be rotated (e.g., 90 degrees), without departing from the scope of the inventive teachings described herein.

The proximate end 204 includes a signal port 208 configured to receive a signal line 210 capable of communicating an optical signal. The distal end 206 includes a transmitting lens 212 and a receiving lens 214 that is separated from the transmitting lens 212. In some embodiments, the transmitting lens 212 and the receiving lens 214 have the same diameter. In other embodiments, the transmitting lens 212 has a first lens diameter (e.g., about 50 μm) and the receiving lens 214 has second lens diameter (e.g., 200 μm) that is larger the transmitting lens 212. Various lens types can be employed as the transmitting lens 212 and the receiving lens 214 including, but not limiting to, a graded index of refraction (GrIn) lenses.

The optical housing 202 has formed therein a transmitting optical channel 216 and a receiving optical channel 218 separated from the transmitting optical channel 216. The transmitting optical channel 216 extends from a transmitting channel input 222 to a transmitting channel output 224. The transmitting channel input 222 is in signal communication with the signal port 208 to receive an input optical signal from the signal line 210. The transmitting channel output 224 is in signal communication with the transmitting lens 212. The receiving optical channel 218 extends from a receiving channel input 226 to a receiving channel output 228. The receiving channel input 226 is in signal communication with the receiving lens 214 to receive a reflected optical signal. The receiving channel output 228 is in signal communication with the signal port 208 to deliver the reflected optical signal to the signal line 210.

In one or more non-limiting embodiments, the optical probe 200 includes one or more optical detectors 229. For example, a first optical detector 229 can be arranged in signal communication with the a first receiving optical fiber 217 and a second optical detector 229 can be arranged in signal communication with the second receiving optical fiber 219. The optical detectors 229 are configured to convert the reflected optical signals delivered by the respective receiving optical fibers 217 and 219 into electrical pulses. The signal line 210 relays the electrical pulses to a controller, which performs time of arrival analysis corresponding to the reflected optical signals. Although the optical detectors 229 are illustrated as being disposed in the signal port 208, the location of the optical detectors 229 is not limited thereto and can be place at various other locations allowing for signal communication with the receiving optical fibers 217 and 219.

Turning now to FIG. 2, the optical probe 200 is shown installed with optical fibers 213, 215, 217 and 219 according to a non-limiting embodiment of the disclosure. The transmitting optical channel 216 has a first diameter and is configured to support a set of transmitting optical fibers 213 and 215 having a first cable diameter. The receiving optical channel 218 has as second diameter and is configured to support a set of receiving optical fibers 217 and 219 having a second cable diameter. The transmitting optical fibers 213, 215 and the receiving optical fibers 217, 219 are configured to communicate an optical signal. In one or more non-limiting embodiments, the optical fibers 213, 215, 217 and 219 can have a diameter ranging, for example, from about 8 µm to about 400 µm. In some embodiments, the transmitting optical fibers 213 and 215 have a first diameter (e.g., about 50 um) and the receiving optical fibers 217 and 219 have a second diameter (e.g., about 200 um) that is greater than the first diameter. The smaller diameter transmitting optical fibers 213 and 215 minimizes the transmitted beam spot size to maximize the beam spot intensity, while the larger diameter receiving optical fibers 217 and 219 maximize the light collected from the reflected beams and maximize the energy level transmission.

The transmitting lens 212 is configured to generate a set of transmit signal beams 230 and 232 that are that are delivered respectively by the set of transmitting optical fibers 213 and 215. The optical fibers 213 and 215 are positioned in the transmitting optical channel 216 at different radial locations behind the transmitting lens 212 to generate the transmitting signal beams 230 and 232 that are offset from one another at angle. The transmitting lens 212 further spreads the output transmit signal beams 230 and 232 at an angle that defines a V-shaped pattern so as to measure two different targeted locations. The angel can range, for example, from about 1 degree to about 41 degrees. The angle divergence between the transmit signal beams 230 and 232 (and consequently the reflected signal beams 234 and 236) can be determined a function of a variety of inputs, including but not limited to, lens diameter, fiber diameter, fiber numerical aperture, wavelength of transmitted/received light source, the index of refraction distribution function of the lens, and fiber-lens stand-off.

Figure 4:
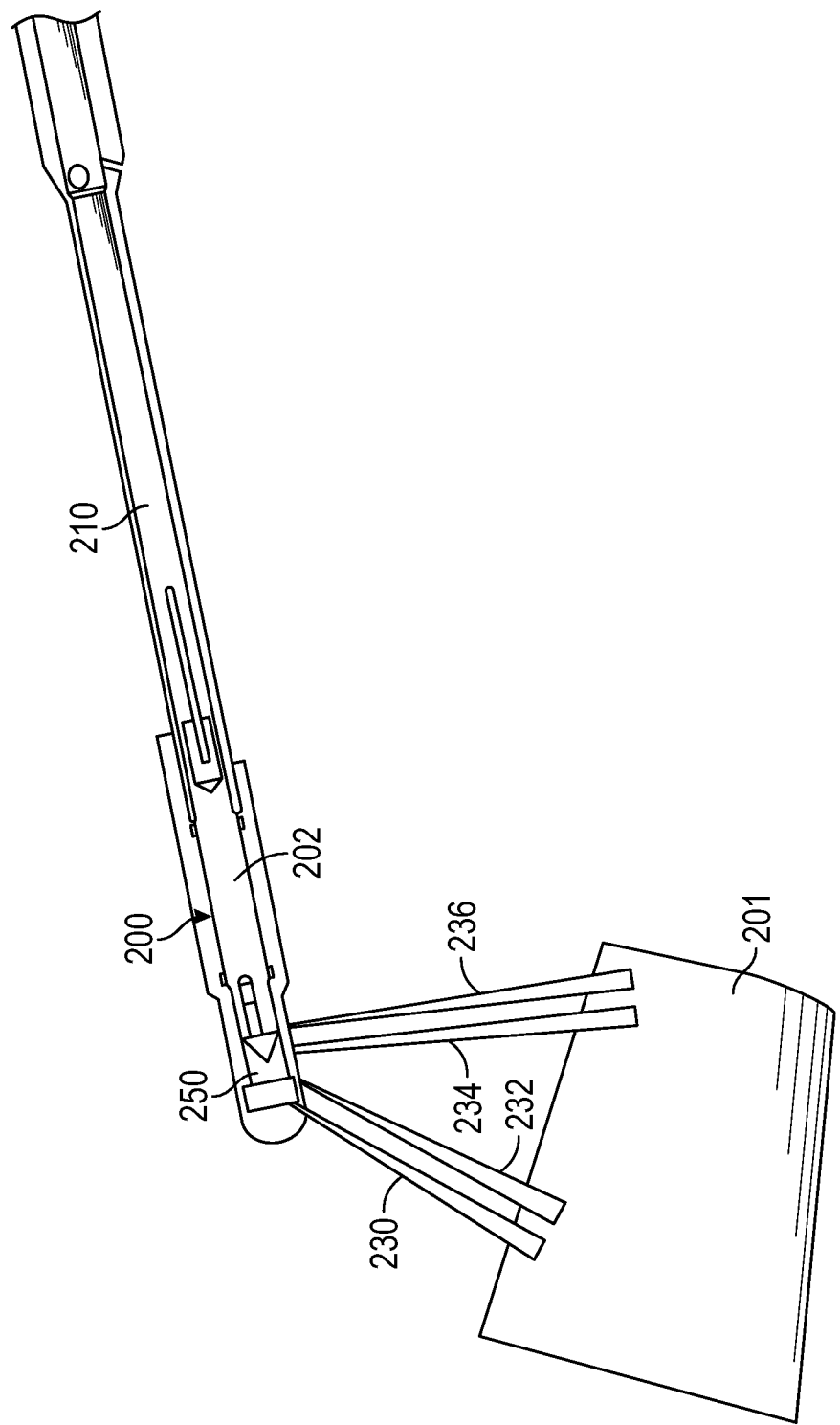
FIG. 4 depicts an optical probe performing a measurement on an airfoil according to another non-limiting embodiment.

One or more non-limiting embodiments, the two different targeted locations are radial locations on an airfoil 201 (see FIGS. 3 and 4). The two different radial locations can be referred to as an inboard target location and an outboard target location. The receiving lens 214 is configured to receive a set of reflected signal beams 234 and 236, and direct them respectively to the receiving optical fibers 217 and 219. In turn, the receiving optical fibers deliver the reflected signal beams 234 and 236 to the signal line 210.

The reflected beams 234 and 236 can be produced in response to the set of transmitting signal beams 230 and 232 reflecting from the inboard target location and an outboard target location, respectively. Accordingly, reflected signal beams 234 and 236 are reflected from the airfoil 201 in a V-shaped pattern that is based, in part, on the locations of the inboard target location and outboard target location. As described above, the optical housing 202 can be rotated to extend at different angels (e.g., 90 degrees). In this manner, the optical probe 200 can measure two different circumferential locations, rather than two different radial locations.

The signal line 210 can be electrically connected to a controller (not shown) to establish data communication therebetween. The controller can perform a time of arrival analysis based on the set of transmitted optical signals and the set of reflected optical signals to determine characteristics of the airfoil including, but not limited, airfoil deflection. In one or more non-limiting embodiments, the time of arrival of two locations (e.g., an inboard location and an outboard location) on every airfoil 201 on every revolution when the engine is running. The controller can compare the output from the optical detectors 229 to a voltage threshold to determine the precise time of arrival of a given airfoil 201 associated with both the beams 230, 232, 234 and 236.

More specifically, the controller compares the times of arrival of the inboard location and the outboard location to determine if the outboard location (e.g., airfoil tip) arrives relatively earlier or later than the inboard location on each revolution. For Integral (or synchronous with engine speed) vibratory responses, there is a 180 degree phase shift in the vibratory phase of the blade at the measurement circumferential location when changing engine speed through a response (i.e. the engine is accelerating). Additionally, there will be a relative increase in vibratory deflection amplitude as the engine order driver and natural frequency converge at the crossing speed and a relative decrease in vibratory amplitude as these frequencies diverge. Using a single degree of freedom analysis, the controller can calculate the amplitude of the airfoil deflection, if any is present.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. An optical probe comprising:
an optical housing extending from a proximate end to an opposing distal end;
a transmitting lens disposed at the distal end and configured to output a first transmitted signal beam having a first transmission axis and a second transmitted signal beam having a second transmission axis, the first transmission axis and the second transmission axis being different; and a receiving lens disposed at the distal end and configured to receive a first reflected signal beam and a second reflected signal beam corresponding respectively to the first transmitted signal beam and the second transmitted signal beam, wherein the optical housing has formed therein a transmitting optical channel configured to communicate an input optical signal from the proximate end to the transmitting lens, and a receiving optical channel separated from the transmitting optical channel to communicate the first reflected signal beam and the second reflected signal beam to the proximate end.

2. The optical probe of claim 1, wherein the transmitting optical channel extends from a transmitting channel input to a transmitting channel output, and wherein the receiving optical channel extends from a receiving channel input to a receiving channel output.

3. The optical probe of claim 2, wherein the transmitting channel input is in signal communication with a signal port to receive an input optical signal from a signal line, and the transmitting channel output is in signal communication with the transmitting lens.

4. The optical probe of claim 2, wherein the receiving channel input is in signal communication with the receiving lens to receive the first reflected signal beam and the second reflected signal beam, and the receiving channel output is in signal communication with a signal port to deliver the first and second reflected signal beams to a signal line.

5. The optical probe of claim 4, further comprising at least one transmitting optical fiber disposed in the transmitting channel and at least one receiving optical fiber disposed in the receiving channel.

6. The optical probe of claim 5, wherein the at least one transmitting optical fiber includes first and second transmitting optical fibers positioned in the transmitting optical channel at different radial locations behind the transmitting lens.

7. The optical probe of claim 6, wherein the at least one receiving optical fiber includes first and second receiving optical fibers positioned in the receiving optical channel at different radial locations behind the receiving lens.

8. The optical probe of claim 5, wherein the at least one transmitting optical fiber has a first diameter and the at least one receiving optical fiber has a second diameter that is larger than the first diameter.

9. The optical probe of claim 8, wherein the transmitting lens has a first lens diameter and the receiving lens has a second lens diameter that is greater than the first lens diameter.

10. The optical probe of claim 1, wherein the first transmitted signal beam and the second transmitted signal beam are spread from the transmitting lens at an angle to define a V-shaped pattern so as to measure two different targeted locations.

11. The optical probe of claim 10, wherein the angle ranges from about 1 degree to about 41 degrees.

12. The optical probe of claim 11, wherein the receiving lens is configured to receive the first reflected signal beam and the second reflected signal beam produced in response to the first transmitted signal beam and the second transmitted signal beam reflecting from respective targeted locations.

13. A method of detecting a deflection in an airfoil, the method comprising:

generating an input optical signal and transmitting the input optical signal from a proximate end of an optical probe to a distal end of the optical probe via a transmitting optical channel;

outputting a first transmitted signal beam and a second transmitted signal beam in response to delivering the input optical signal through a transmitting lens disposed at the distal end of the optical probe;

reflecting the first transmitted signal beam and the second transmitted signal beam from the airfoil to produce a first reflected signal beam and a second reflected signal beam;

receiving the first reflected signal beam and the second reflected signal beam by a receiving lens disposed at the distal end of the optical probe; and determining a deflection of the airfoil based on the first reflected signal beam and the second reflected signal beam.

14. The method of claim 13, wherein transmitting the input optical signal further comprises transmitting the input optical signal along at least one transmitting optical fiber disposed in the transmitting optical channel.

15. The method of claim 14, wherein receiving the first reflected signal beam and the second reflected signal beam further comprises transmitting the first reflected signal beam and the second reflected signal beam along at least one receiving optical fiber disposed in a receiving optical channel.

16. The method of claim 15, wherein the at least one transmitting optical fiber includes first and second transmitting optical fibers positioned in the transmitting optical channel at different radial locations behind the transmitting lens.

17. The method of claim 16, wherein the at least one receiving optical fiber includes first and second receiving optical fibers positioned in the receiving optical channel at different radial locations behind the receiving lens.

18. The method of claim 17, wherein outputting the first transmitted signal beam and the second transmitted signal beam further comprises spreading the first transmitted signal beam and the second transmitted signal beam from the transmitting lens in a V-shaped pattern so as to measure two different targeted locations.

19. The method of claim 18 wherein receiving the first reflected signal beam and the second reflected signal beam further comprises receiving the first reflected signal beam and the second reflected signal beam in response to the first transmitted signal beam and the second transmitted signal beam reflecting from the two different targeted locations.

20. The method of claim 19, further comprising converting the first reflected signal beam and the second reflected signal beam into electrical pulses, and determining the deflection based on the first reflected signal beam and the second reflected signal beam.

* * * * *